(12) United States Patent
Lee et al.

(10) Patent No.: US 11,655,366 B2
(45) Date of Patent: May 23, 2023

(54) TRANSPARENT POLYIMIDE MIXTURE, METHOD FOR MANUFACTURING THE TRANSPARENT POLYIMIDE MIXTURE, AND METHOD FOR MANUFACTURING TRANSPARENT POLYIMIDE FILM

(71) Applicant: Zhen Ding Technology Co., Ltd., Taoyuan (TW)

(72) Inventors: Kuan-Wei Lee, Taoyuan (TW); Pei-Jung Wu, Taoyuan (TW); Szu-Hsiang Su, Taoyuan (TW); Shou-Jui Hsiang, Tayuan (TW)

(73) Assignee: Zhen Ding Technology Co., Ltd., Taoyuan (TW)

( * ) Notice: Subject to any disclaimer, the term of this patent is extended or adjusted under 35 U.S.C. 154(b) by 209 days.

(21) Appl. No.: 17/110,950

(22) Filed: Dec. 3, 2020

(65) Prior Publication Data
US 2022/0169851 A1   Jun. 2, 2022

(30) Foreign Application Priority Data
Nov. 27, 2020   (CN) .......................... 202011360805.9

(51) Int. Cl.
| | |
|---|---|
| *C08L 79/08* | (2006.01) |
| *C08G 69/32* | (2006.01) |
| *C08G 73/10* | (2006.01) |
| *C08K 5/20* | (2006.01) |
| *C08K 5/101* | (2006.01) |
| *C08K 5/3415* | (2006.01) |

(52) U.S. Cl.
CPC .............. *C08L 79/08* (2013.01); *C08G 69/32* (2013.01); *C08G 73/1028* (2013.01); *C08K 5/101* (2013.01); *C08K 5/20* (2013.01); *C08K 5/3415* (2013.01); *C08L 2201/08* (2013.01); *C08L 2201/10* (2013.01); *C08L 2203/16* (2013.01); *C08L 2203/20* (2013.01)

(58) Field of Classification Search
CPC ...... C09D 179/00; C08G 73/10; C08G 69/32; C08L 79/08
See application file for complete search history.

(56) References Cited

U.S. PATENT DOCUMENTS

| | | | | |
|---|---|---|---|---|
| 4,388,451 A | * | 6/1983 | Culbertson | ............ B01D 71/44 528/149 |
| 2018/0201579 A1 | * | 7/2018 | Yamada | ............. C07D 207/452 |

FOREIGN PATENT DOCUMENTS

| | | | |
|---|---|---|---|
| JP | 2018193569 | * | 12/2018 |
| TW | 202039636 A | | 11/2020 |

* cited by examiner

*Primary Examiner* — Gregory Listvoyb
(74) *Attorney, Agent, or Firm* — ScienBiziP, P.C.

(57) ABSTRACT

A transparent polyimide mixture is disclosed. The transparent polyimide mixture includes a transparent polyimide, an additive, and a solvent. A molecular chain of the transparent polyimide includes an active hydrogen atom. The additive includes a carbodiimide group. An equivalent ratio of the active hydrogen atom and the carbodiimide group is in a range of 1:0.8 to 1:1.2. A method for preparing the transparent polyimide mixture, a transparent polyimide film, and a method for preparing a transparent polyimide film are also disclosed.

15 Claims, 4 Drawing Sheets

TRANSPARENT POLYIMIDE MIXTURE, METHOD FOR MANUFACTURING THE TRANSPARENT POLYIMIDE MIXTURE, AND METHOD FOR MANUFACTURING TRANSPARENT POLYIMIDE FILM

FIELD

The subject matter herein generally relates to a transparent polyimide mixture, a method for manufacturing the transparent polyimide mixture, and a method for manufacturing a transparent polyimide film.

BACKGROUND

Touch panels of electronic devices may be made of glass. The glass has high transparency and high hardness, but it may be heavy and inflexible. Thus, such kind of touch panel cannot be applied in a flexible electronic device.

Polyimide (PI) is a flexible material, which has the characteristics of high heat resistance, high chemical resistance, good electrical properties, and good bending resistance. Thus, a PI film is widely used in a flexible touch panel. However, the PI film is usually brown or yellow, that is, the PI film has low transparency, which affects the appearance of the touch panel. In addition, the hardness of the PI film is very low, causing the PI film to be easily broken by external impacts.

BRIEF DESCRIPTION OF THE DRAWINGS

Implementations of the present disclosure will now be described, by way of example only, with reference to the attached figures.

DETAILED DESCRIPTION

Figure 1:
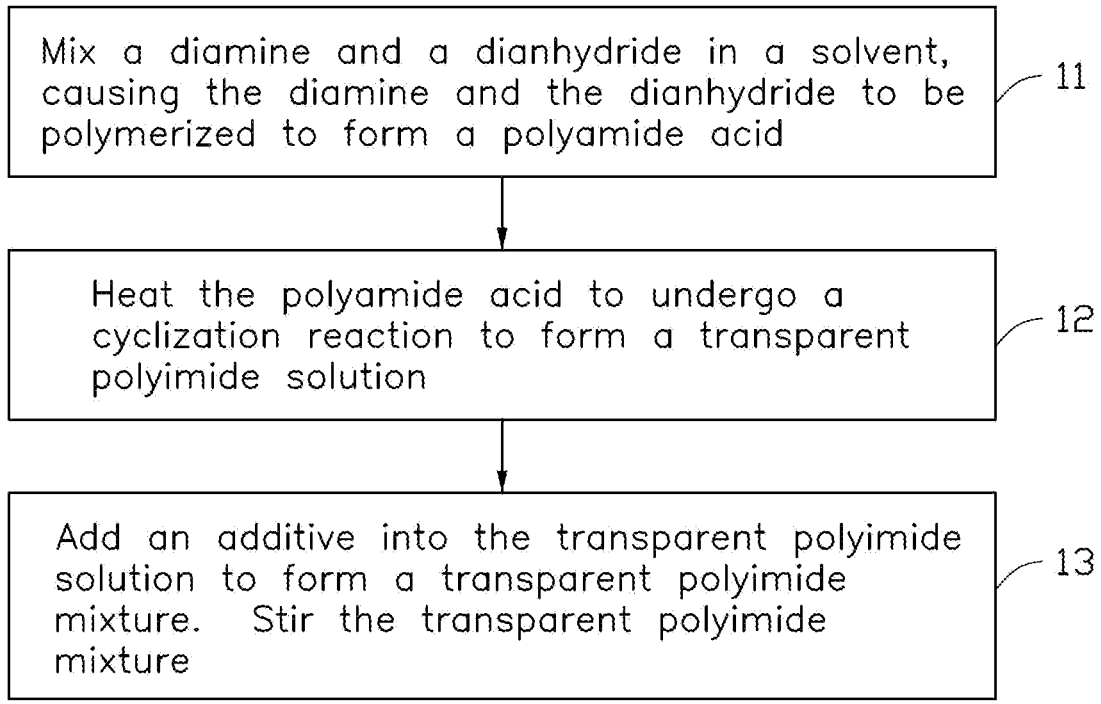
FIG. 1 is a flowchart of a method for manufacturing a transparent polyimide mixture according to the present disclosure.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

The present disclosure provides a transparent polyimide mixture, which comprises a transparent polyimide, an additive, and a solvent. A molecular chain of the transparent polyimide comprises an active hydrogen atom. The additive comprises a carbodiimide group (N=C=N). When the transparent polyimide mixture is heated, the active hydrogen atom and the carbodiimide group are cross-linked, and the carbodiimide groups are also cross-linked with each other. Thus, a crosslinked network structure is obtained. When the transparent polyimide mixture is used to manufacture a transparent polyimide film, the crosslinked network structure can improve a hardness and mechanical properties of the transparent polyimide film. The crosslinked degree can be controlled by adjusting the amounts of the active hydrogen atom and the carbodiimide group. The crosslinked degree affects a transparency, the hardness, and the mechanical properties of the transparent polyimide film.

In an embodiment, an equivalent ratio of the active hydrogen atom and the carbodiimide group is in a range of 1:0.8 to 1:1.2.

In an embodiment, the equivalent ratio of the active hydrogen atom and the carbodiimide group is 1:1.

In an embodiment, the transparent polyimide and the additive form a solid content of the transparent polyimide mixture. The solid content has a mass ratio of 30% to 45% in the transparent polyimide mixture.

In an embodiment, the additive comprises a solvent-type bridging agent.

In an embodiment, the solvent is a polar solvent, which may be at least one of N-methyl pyridoxerane (NMP), dimethylacetamide (DMA), and 1,4-butyrolactone (GBL).

In an embodiment, the solvent is a mixture, which comprises the NMP and the GBL. The mass ratio of the NMP and the GBL is 1:1.

In an embodiment, the solvent further comprises xylene.

FIG. 1 illustrates a flowchart of a method for manufacturing the transparent polyimide mixture. The method for manufacturing the transparent polyimide mixture is provided by way of example, as there are a variety of ways to carry out the method. The method can begin at block 11.

Block 11, a diamine and a dianhydride are mixed in the solvent, causing the diamine and the dianhydride to be polymerized to form a polyamide acid.

In an embodiment, the diamine and the dianhydride are polymerized at room temperature, for a time period in a range of 16 h to 18 h.

Block 12, the polyamide acid is heated to undergo a cyclization reaction to form a transparent polyimide solution.

The molecular chain of the polyimide comprises the active hydrogen atom.

In an embodiment, the transparent polyimide is the solid of the transparent polyimide solution. The solid content of the transparent polyimide solution has a mass ratio in a range of 20% to 25%.

In an embodiment, at least the diamine or the dianhydride comprises the active hydrogen atom.

In an embodiment, the diamine comprises the active hydrogen atom.

In an embodiment, the diamine comprises at least one of 3,3'-diamino-4,4'-dihydroxydiphenylsulfone (3,3'-DABS), 2,2-bis(3-amino-4-hydroxyphenyl)hexafluoropropane (6FAP), and 3,5-diaminobenzoic acid (3,5-DABA).

In an embodiment, the dianhydride comprises at least one of 1,2,3,4-cyclobutane tetracarboxylic dianhydride (CBDA), 4,4'-(hexafluoroisopropylidene) diophthalic anhydride (6FDA), pyromellitic dianhydride (H-PMDA), bicyclo[2.2.2]octyl-7-ene-2,3,5,6-tetracarboxylic dianhydride (BTA), and cyclopentaerythritol dianhydride (CPDA).

In an embodiment, the polyamide acid is cyclized under a temperature in range of 180 Celsius degrees to 190 Celsius degrees, for a period time of 16 hours to 18 hours to form the transparent polyimide mixture.

In an embodiment, the reaction process in the transparent polyimide solution is as follow.

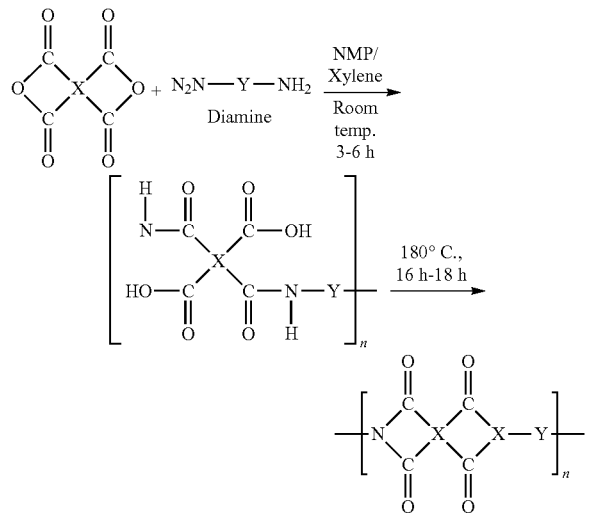

The polyamide acid is cyclized under a temperature higher than 300 Celsius degrees for preparing a polyimide. Under this reaction condition, a conjugation effect and a charge transfer mismatch effect will occur. π electrons on the conjugated benzene ring will produce the conjugation effect. The charge transfer mismatch effect will occur between molecules and within a molecule. The above two effects will cause the polyimide to have a high absorption in visible light region. Thus, the polyimide is brown or yellow.

In order to prepare a transparent polyimide, the present disclosure introduces a polar molecular chain group, an asymmetric molecular structure, an aliphatic side chain without benzene ring, or a side chain with large free volume into the transparent polyimide, to minimize the intermolecular and intramolecular charge transfer. The transparent polyimide also has a good heat resistance and a chemical resistance.

In an embodiment, the polar molecular chain group may be, but is not limited to, —O—, —SO$_2$—, —CO—, ester group, nitrogen-containing heterocycle, and —CF$_3$.

In an embodiment, the asymmetric molecular structure may be, but is not limited to, 4,4'-diamino-2,2'-bis (trifluoromethyl biphenyl) (TFMB), 1,3-bis (3-Aminophenoxy) benzene (APBN), 9,9-bis (4-amino-3-fluorophenyl) fluorene (BFAF) and 4,9-bis (4-amino-3-fluorophenyl) fluorene (BFAF), respectively, 4'-(hexafluoroisopropylidene) diophthalic anhydride (6FDA) 2,2-bis (3-amino-4-hydroxyphenyl) hexafluoropropane (6FAP).

In an embodiment, the side chain with large free volume may be, but is not limited to, TFMB, BFAF, 6FDA, 6FAP.

Block 13, the additive is added into the transparent polyimide solution to form the transparent polyimide mixture. The transparent polyimide mixture is stirred.

In addition, the present disclosure introduces the active hydrogen atoms (for example, —OH, —COOH or —NH$_2$) into the polyimide. The active hydrogen atom and the carbodiimide group in the additive to be cross-linked to form the crosslinked network structure, thereby improving the hardness and mechanical properties of the transparent polyimide film.

In an embodiment, the reaction process between a carboxylic group (—COOH) and the N=C=N is as follow.

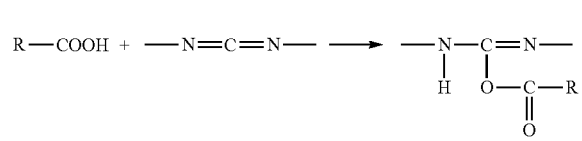

In an embodiment, the reaction process between an amino (—NH$_2$) and the N=C=N is as follow.

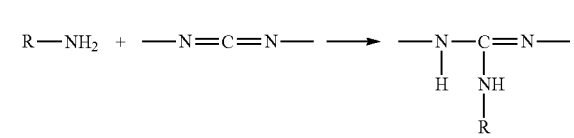

In an embodiment, the reaction process between a hydroxyl (—OH) and the N=C=N is as follow.

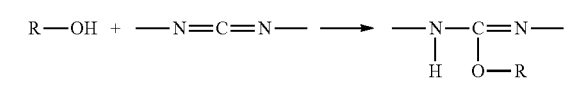

In an embodiment, the reaction processes between carbodiimide groups (N=C=N) are as follows.

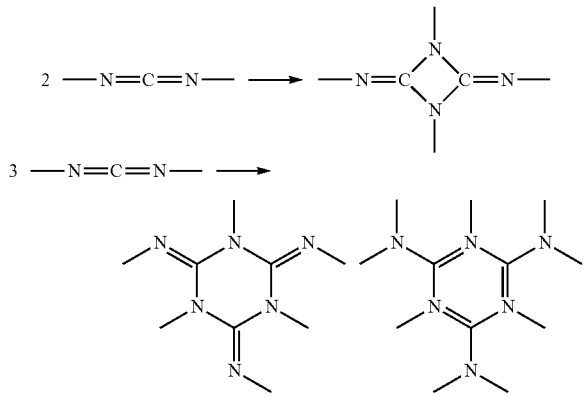

Figure 2:
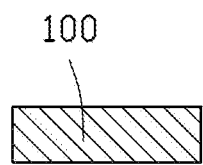
FIG. 2 is a diagrammatic view of polymer composite film according to the present disclosure.

Referring to FIG. 2, the present disclosure further provides a transparent polyimide film 100, which is formed by heating the transparent polyimide mixture.

The transparent polyimide film 100 has an excellent transmittance and a high hardness. Meanwhile, the transparent polyimide film 100 has a high corrosion resistance, a high temperature resistance, and a high mechanical strength. Thus, the transparent polyimide film 100 can be applied in a flexible touch panel.

In an embodiment, the transmittance of the transparent polyimide film 100 greater than or equal to 88% within a wavelength range of 400 nm to 700 nm.

In an embodiment, the hardness of the transparent polyimide film 100 greater than or equal to 4H.

In an embodiment, a tensile strength of the transparent polyimide film 100 is greater than or equal to 150 MPa.

Figure 3:
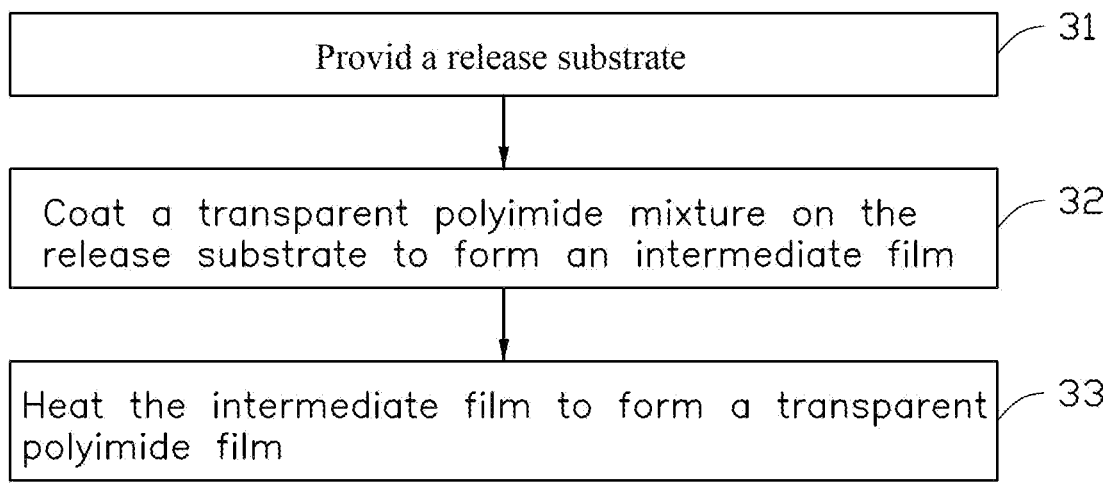
FIG. 3 is a flowchart of a method for manufacturing a transparent polyimide film according to the present disclosure.

FIG. 3 illustrates a flowchart of a method for manufacturing the transparent polyimide film 100. The method for manufacturing the transparent polyimide film 100 is provided by way of example, as there are a variety of ways to carry out the method. The method can begin at block 31.

Figure 4A:
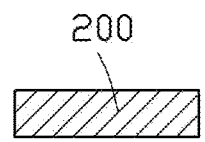
FIGS. 4A, 4B, 4C, and 4D are diagrammatic views showing a method for manufacturing a transparent polyimide film.

Block 31, referring to FIG. 4A, a release substrate 200 is provided.

In an embodiment, the release substrate 200 which may be, but is not limited to, mirror copper plate.

In an embodiment, a roughness of the mirror copper plate is lower than or equal to 0.02

Figure 4B:
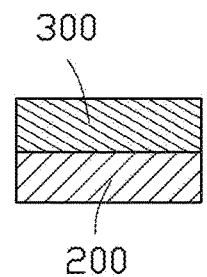

Block 32, referring to FIG. 4B, the transparent polyimide mixture is coated on the release substrate 200 to form an intermediate film 300.

Figure 4C:
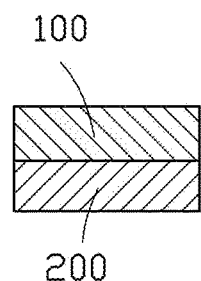
Figure 4D:
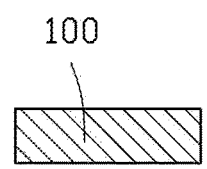

Block 33, referring to FIG. 4C, the intermediate film 300 is heated to form a transparent polyimide film 100.

In an embodiment, the thickness of the transparent polyimide film 100 is about 12 μm.

The active hydrogen atom in the transparent polyimide and the carbodiimide group in the additive are heated to form a crosslinking structure.

In an embodiment, the heating temperature is in a range of 120 Celsius degrees to 150 Celsius degrees.

The present disclosure further provides a device including the transparent polyimide film 100.

Synthetic Example 1

3.3'-DABS (0.1 mol, 28.03 g) and GBL+NMP (mass ratio is 1:1, 142.92 g) were added into a 500 ml container to form a first mixture. Then CBDA (0.1 mol, 19.61 g) was added into the first mixture to form a second mixture. The second mixture was stirred for about 12 h. Then the second mixture was heated at 80 Celsius degrees for about 4 h to form the polyamide acid solution. The xylene (28.58 g) was added into the second mixture at the same time to form a third mixture. Then the third mixture was heated at 180 Celsius degrees for 16 h to 18 h to form the transparent polyimide solution.

Synthetic Example 2

6FAP (0.1 mol, 36.63 g) and GBL +NMP (mass ratio is 1:1, 168.71 g) were added into a 500 ml container to form a first mixture. Then CBDA (0.1 mol, 19.61 g) was added into the first mixture to form a second mixture. The second mixture was stirred for about 12 h. Then the second mixture was heated at 80 Celsius degrees for about 4 h to form the polyamide acid solution. The xylene (33.74 g) was added into the second mixture at the same time to form a third mixture. Then the third mixture was heated at 180 Celsius degrees for 16 h to 18 h to form the transparent polyimide solution.

Synthetic Example 3

3.3'-DABS (0.1 mol, 28.03 g) and GBL+NMP (mass ratio is 1:1, 217.36 g) were added into a 500 ml container to form a first mixture. Then 6FDA (0.1 mol, 44.42 g) was added into the first mixture to form a second mixture. The second mixture was stirred for about 12 h. Then the second mixture was heated at 80 Celsius degrees for about 4 h to form the polyamide acid solution. The xylene (43.47 g) was added into the second mixture at the same time to form a third mixture. Then the third mixture was heated at 180 Celsius degrees for 16 h to 18 h to form the transparent polyimide solution.

Synthetic Example 4

6FAP (0.1 mol, 36.63 g) and GBL+NMP (mass ratio is 1:1, 243.15 g) were added into a 500 ml container to form a first mixture. Then 6FDA (0.1 mol, 44.42 g) was added into the first mixture to form a second mixture. The second mixture was stirred for about 12 h. Then the second mixture was heated at 80 Celsius degrees for about 4 h to form the polyamide acid solution. The xylene (48.63 g) was added into the second mixture at the same time to form a third mixture. Then the third mixture was heated at 180 Celsius degrees for 16 h to 18 h to form the transparent polyimide solution.

Synthetic Example 5

4.4'-DDS (0.1 mol, 24.83 g) and GBL+NMP (mass ratio is 1:1, 207.76 g) were added into a 500 ml container to form a first mixture. Then 6FDA (0.1 mol, 44.42 g) was added into the first mixture to form a second mixture. The second mixture was stirred for about 12 h. Then the second mixture was heated at 80 Celsius degrees for about 4 h to form the polyamide acid solution. The xylene (41.55 g) was added into the second mixture at the same time to form a third mixture. Then the third mixture was heated at 180 Celsius degrees for 16 h to 18 h to form the transparent polyimide solution.

The monomers for preparing the transparent polyimide solution are shown in Table 1. Five transparent polyimide films manufactured by the above-mentioned method in FIG. 2 with the transparent polyimide solution synthesized by Synthetic Examples 1-5. The test results of corresponding transparent polyimide films are also shown in Table 1.

TABLE 1

|  | Synthetic example 1 | Synthetic example 2 | Synthetic example 3 | Synthetic example 4 | Synthetic example 5 |
| --- | --- | --- | --- | --- | --- |
| diamine (CBDA, mol) | 0.1 | 0.1 |  |  |  |
| diamine (6FDA, mol) |  |  | 0.1 | 0.1 | 0.1 |
| dianhydride (3,3'-DABS, mol) | 0.1 |  | 0.1 |  |  |
| dianhydride (6FAP, mol) |  | 0.1 |  | 0.1 |  |
| dianhydride (4,4' DDS, mol) |  |  |  |  | 0.1 |
| NMP (wt %) | 50 | 50 | 50 | 50 | 50 |
| GBL (wt %) | 50 | 50 | 50 | 50 | 50 |
| NMP + GBL (g) | 142.92 | 168.71 | 217.36 | 243.15 | 207.76 |
| Transmittance (550 nm, %) | 91 | 93 | 91 | 92 | 88 |
| Pencil hardness | H | H | H | H | H |
| Tensile strength (MPa) | 123 | 119 | 131 | 134 | 126 |
| Elongation (%) | 6.1 | 5.2 | 5.7 | 5.3 | 5.8 |

From Table 1, the transparent polyimide comprises the active hydrogen atom (for example, —$CF_3$, —$SO_2$—) and an aliphatic group, which reduced intermolecular and intramolecular charge transfer. The transparence of the transparent polyimide film is greater than or equal to 88% within a wavelengths of 550 nm. But the transparent polyimide films formed by the transparent polyimide solution synthesized by Synthetic Examples 1-5 have low hardness. Such kind of transparent polyimide films cannot be applied in a flexible electronic device. In addition, the diamines in the transparent polyimide solution synthesized by Synthetic Examples 1-5 comprise the active hydrogen atoms (for example, —OH). From Table 1, the transparence of the transparent polyimide films will not affected by the introduction of the active hydrogen atom. Moreover, the active hydrogen atom can cross-linked with carbodiimide group (N=C=N) without catalyst to further enhance the hardness of the transparent polyimide film.

EXAMPLE 1

The transparent polyimide solution (10 g) obtained by synthetic example 1 and the additive (V-05, 2.20 g) were added into a 100 ml container to form a mixture. The mixture was stirred for about 6 hours to form the transparent polyimide mixture.

EXAMPLE 2

The transparent polyimide solution (10 g) obtained by synthetic example 2 and the additive (V-05, 1.87 g) were added into a 100 ml container to form a mixture. The mixture was stirred for about 6 hours to form the transparent polyimide mixture.

EXAMPLE 3

The transparent polyimide solution (10 g) obtained by synthetic example 3 and the additive (V-05, 1.45 g) were added into a 100 ml container to form a mixture. The mixture was stirred for about 6 hours to form the transparent polyimide mixture.

EXAMPLE 4

The transparent polyimide solution (10 g) obtained by synthetic example 4 and the additive (V-05, 1.30 g) were added into a 100 ml container to form a mixture. The mixture was stirred for about 6 hours to form the transparent polyimide mixture.

EXAMPLE 5

The transparent polyimide solution (10 g) obtained by synthetic example 1 and the additive (V-05, 3.30 g) were added into a 100 ml container to form a mixture. The mixture was stirred for about 6 hours to form the transparent polyimide mixture.

EXAMPLE 6

The transparent polyimide solution (10 g) obtained by synthetic example 2 and the additive (V-05, 2.81 g) were added into a 100 ml container to form a mixture. The mixture was stirred for about 6 hours to form the transparent polyimide mixture.

EXAMPLE 7

The transparent polyimide solution (10 g) obtained by synthetic example 3 and the additive (V-05, 2.17 g) were added into a 100 ml container to form a mixture. The mixture was stirred for about 6 hours to form the transparent polyimide mixture.

EXAMPLE 8

The transparent polyimide solution (10 g) obtained by synthetic example 4 and the additive (V-05, 1.95 g) were added into a 100 ml container to form a mixture. The mixture was stirred for about 6 hours to form the transparent polyimide mixture.

The components forming the transparent polyimide mixture are shown in Table 2. Eight transparent polyimide films manufactured by the above-mentioned method in FIG. 2 with the transparent polyimide mixture synthesized by Synthetic Examples 1 - 4. The test results of corresponding transparent polyimide films are also shown in Table 2.

TABLE 2

|  | Example 1 | Example 2 | Example 3 | Example 4 | Example 5 | Example 6 | Example 7 | Example 8 |
| --- | --- | --- | --- | --- | --- | --- | --- | --- |
| N=C=N (V-05, equivalent ratio) | 0.8 | 0.8 | 0.8 | 0.8 | 1.2 | 1.2 | 1.2 | 1.2 |
| Synthetic example 1 (g) | 10 |  |  |  | 10 |  |  |  |
| Synthetic example 2 (g) |  | 10 |  |  |  | 10 |  |  |
| Synthetic example 3 (g) |  |  | 10 |  |  |  | 10 |  |
| Synthetic example 4 (g) |  |  |  | 10 |  |  |  | 10 |
| Transmittance (550 nm, %) | 89 | 91 | 90 | 91 | 88 | 89 | 88 | 89 |
| Pencil hardness | 4H | 4H | 5H | 5H | 6H | 6H | 6H | 6H |
| Tensile strength (MPa) | 159 | 163 | 168 | 173 | 223 | 242 | 239 | 252 |
| Elongation (%) | 8.6 | 7.8 | 8.9 | 7.5 | 2.9 | 2.3 | 2.8 | 2.2 |

COMPARATIVE EXAMPLE 1

The transparent polyimide solution (10 g) obtained by synthetic example 5 and the additive (V-05, 2 g) were added into a 100 ml container to form a mixture. The mixture was stirred for about 6 hours to form the transparent polyimide mixture.

COMPARATIVE EXAMPLE 2

The transparent polyimide solution (10 g) obtained by synthetic example 1 and the additive (V-05, 1.92 g) were added into a 100 ml container to form a mixture. The mixture was stirred for about 6 hours to form the transparent polyimide mixture.

COMPARATIVE EXAMPLE 3

The transparent polyimide solution (10 g) obtained by synthetic example 2 and the additive (V-05, 1.64 g) were added into a 100 ml container to form a mixture. The mixture was stirred for about 6 hours to form the transparent polyimide mixture.

COMPARATIVE EXAMPLE 4

The transparent polyimide solution (10 g) obtained by synthetic example 3 and the additive (V-05, 1.27 g) were added into a 100 ml container to form a mixture. The mixture was stirred for about 6 hours to form the transparent polyimide mixture.

COMPARATIVE EXAMPLE 5

The transparent polyimide solution (10 g) obtained by synthetic example 4 and the additive (V-05, 1.14 g) were added into a 100 ml container to form a mixture. The mixture was stirred for about 6 hours to form the transparent polyimide mixture.

COMPARATIVE EXAMPLE 6

The transparent polyimide solution (10 g) obtained by synthetic example 1 and the additive (V-05, 3.57 g) were added into a 100 ml container to form a mixture. The mixture was stirred for about 6 hours to form the transparent polyimide mixture.

COMPARATIVE EXAMPLE 7

The transparent polyimide solution (10 g) obtained by synthetic example 2 and the additive (V-05, 3.04 g) were added into a 100 ml container to form a mixture. The mixture was stirred for about 6 hours to form the transparent polyimide mixture.

COMPARATIVE EXAMPLE 8

The transparent polyimide solution (10 g) obtained by synthetic example 3 and the additive (V-05, 2.35 g) were added into a 100 ml container to form a mixture. The mixture was stirred for about 6 hours to form the transparent polyimide mixture.

COMPARATIVE EXAMPLE 9

The transparent polyimide solution (10 g) obtained by synthetic example 4 and the additive (V-05, 2.11 g) were added into a 100 ml container to form a mixture. The mixture was stirred for about 6 hours to form the transparent polyimide mixture.

The components forming the transparent polyimide mixture are shown in Table 3. Nine transparent polyimide films manufactured by the above-mentioned method in FIG. 2 with the transparent polyimide mixture synthesized by Synthetic Examples 1-5. The test results of corresponding transparent polyimide films are also shown in Table 3.

TABLE 3

| | Com. Example 1 | Com. Example 2 | Com. Example 3 | Com. Example 4 | Com. Example 5 | Com. Example 6 | Com. Example 7 | Com. Example 8 | Com. Example 9 |
|---|---|---|---|---|---|---|---|---|---|
| $N{=}C{=}N$ (V-05, equivalent ratio) | — | 0.7 | 0.7 | 0.7 | 0.7 | 1.3 | 1.3 | 1.3 | 1.3 |
| Synthetic example 1 (g) | | 10 | | | | 10 | | | |
| Synthetic example 2 (g) | | | 10 | | | | 10 | | |
| Synthetic example 3 (g) | | | | 10 | | | | 10 | |
| Synthetic example 4 (g) | | | | | 10 | | | | 10 |
| Synthetic example 5 (g) | 10 | | | | | | | | |
| Transmittance (550 nm, %) | 86 | 90 | 92 | 90 | 91 | 86 | 87 | 85 | 87 |
| Pencil hardness | 2H | 2H | 3H | 3H | 3H | 6H | 6H | 6H | 6H |
| Tensile strength (MPa) | 81 | 153 | 158 | 161 | 167 | 231 | 252 | 249 | 263 |
| Elongation (%) | 1.5 | 7.8 | 6.9 | 7.7 | 6.7 | 2.5 | 1.7 | 2.3 | 1.5 |

In tables 2-3, the additive is V-05 which was purchase from An Fong Development Co., LTD. An equivalent of the V-05 is 262.

In table 3, the Com. is the abbreviation of comparative.

The ratio of the N=C=N in Tables 2-3 is calculated by an equivalent ratio with the active hydrogen atom in the transparent polyimide.

The pencil hardness was tested based on the IPC-TM-650 2.4.27.2 standard.

The tensile test was tested based on the ASTM D638 standard.

From tables 1-2, compared with Synthesis Examples 1-5, the addition of the carbodiimide group (V-05) in Examples 1-8 can improve the hardness of the transparent polyimide film obviously. The hardness is improved form 1H to 4H. This is because, the active hydrogen atom in the transparent polyimide and the carbodiimide group can be cross-linked to form a network structure. Meanwhile, the transparence of the transparent polyimide film is not impact by the addition of the additive when the equivalent ratio of the active hydrogen atom and the carbodiimide group is in a range of 1:0.8 to 1:1.2. Compared with Examples 1-4, the addition of the increasing amount is increased in Examples 5-8. With the increasing amount of the carbodiimide group, the hardness is increased. This is because the carbodiimide group and the active hydrogen atom in the transparent polyimide are cross-linked to form a crosslinked structure, and the carbodiimide groups are cross-linked to form another crosslinked structure themselves at the same time. But the transparence of the transparent polyimide film will decrease when the amount of the carbodiimide group is so high. This is because the V-05 which contains the carbodiimide group is a yellow brown liquid. In addition, the elongation will reduce when the equivalent ratio of the active hydrogen atom and the carbodiimide group is over the 1:1.2.

From tables 2-3, the equivalent ratio of the active hydrogen atom and the carbodiimide group is lower than 1:0.8 in Comparative Examples 2-5. Compared with Examples 1-8, the amount of the carbodiimide group is too low in Comparative Examples 2-5, which result in low mechanical properties and hardness of the transparent polyimide film. The equivalent ratio of the active hydrogen atom and the carbodiimide group is higher than 1:1.2 in Comparative Examples 6-9. Compared with Examples 1-8, the amount of the carbodiimide group is too high in Comparative Examples 6-9, which reduces the transparence and the elongation of the transparent polyimide film. this is because the crosslinked degree is high when the amount of carbodiimide group is too large.

The transparent polyimide solution in Comparative Example 1 is synthesized by Synthetic Example 5. The transparent polyimide has no active hydrogen atom in the molecular chain, which results in low mechanical properties of the transparent polyimide film. This is because there is no crosslinked structure in the transparent polyimide film.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A transparent polyimide mixture, comprising:
a polyimide;
an additive; and
a solvent;
wherein a molecular chain of the transparent polyimide comprises an active hydrogen atom, the additive comprises a carbodiimide group, an equivalent ratio of the active hydrogen atom and the carbodiimide group is in a range of 1:0.8 to 1:1.2, the transparent polyimide is polymerized by a diamine and a dianhydride, the diamine comprises the active hydrogen atom, the diamine comprises at least one of 3,3'-diamino-4,4'-dihydroxydiphenylsulfone, 2,2-bis(3-amino-4-hydroxyphenyl)hexafluoropropane, and 3,5-diaminobenzoic acid.

2. The transparent polyimide mixture of claim 1, wherein the equivalent ratio of the active hydrogen atom and the carbodiimide group is 1:1.

3. The transparent polyimide mixture of claim 2, wherein the transparent polyimide and the additive form a solid content of the transparent polyimide mixture, and the solid content has a mass ratio of 30% to 45% in the transparent polyimide mixture.

4. The transparent polyimide mixture of claim 1, wherein the additive comprises a solvent-typed bridging agent.

5. The transparent polyimide mixture of claim 1, wherein the solvent comprises at least one of N-methyl pyridoxerane, dimethyl acetylamide, and 1,4-butyrolactone.

6. A method of preparing a transparent polyimide mixture, comprising:
mixing a transparent polyimide, an additive, and a solvent to form the transparent polyimide mixture,
wherein a molecular chain of the transparent polyimide comprises an active hydrogen atom, the additive comprises a carbodiimide group, an equivalent ratio of the active hydrogen atom and the carbodiimide group is in a range of 1:0.8 to 1:1.2, the transparent polyimide is polymerized by a diamine and a dianhydride, the diamine comprises the active hydrogen atom, the diamine comprises at least one of 3,3'-diamino-4,4'-dihydroxydiphenylsulfone, 2,2-bis(3-amino-4-hydroxyphenyl)hexafluoropropane, and 3,5-diaminobenzoic acid.

7. The method of claim 6, wherein the equivalent ratio of the active hydrogen atom and the carbodiimide group is 1:1.

8. The method of claim 6, wherein the transparent polyimide and the additive form a solid content of the transparent polyimide mixture, and the solid content has a mass ratio of 30% to 45% in the transparent polyimide mixture.

9. The method of claim 6, wherein the additive comprises a solvent-type bridging agent.

10. The method of claim 6, wherein the solvent comprises at least one of N-methyl pyridoxerane, dimethyl acetylamide, and 1,4-butyrolactone.

11. The method of claim 6, wherein the dianhydride comprises at least one of 1,2,3,4-cyclobutanetetracarboxylic dianhydride, 4,4'-(hexafluoroisopropylidene)diphthalic anhydride, pyromellitic dianhydride, benzotriazole, and cyclopentaerythritol dianhydride.

12. A method of preparing a transparent polyimide film, comprising:
providing a release substrate;
coating a transparent polyimide mixture on the release substrate to form an intermediate film; and
heating the intermediate film to form the transparent polyimide film;

wherein the transparent polyimide mixture comprises a transparent polyimide, an additive, and a solvent, a molecular chain of the transparent polyimide comprises an active hydrogen atom, the additive comprises a carbodiimide group, an equivalent ratio of the active hydrogen atom and the carbodiimide group is in a range of 1:0.8 to 1:1.2, the active hydrogen atom and the carbodiimide group are heated to form a crosslinking structure, the transparent polyimide is polymerized by a diamine and a dianhydride, the diamine comprises the active hydrogen atom, the diamine comprises at least one of 3,3'-diamino-4,4'-dihydroxydiphenylsulfone, 2,2-bis(3-amino-4-hydroxyphenyl)hexafluoropropane, and 3,5-diaminobenzoic acid.

13. The method of claim 12, wherein the intermediate film is heated at a temperature in a range of 180 Celsius degrees to 190 Celsius degrees, for a period time of 16 h to 18 h.

14. The method of claim 12, wherein the transparent polyimide film has a transmittance greater than or equal to 88% within a wavelength range of 400 nm to 700 nm.

15. The method of claim 12, wherein the transparent polyimide film has a hardness greater than or equal to 4 H.

* * * * *